(12) United States Patent
Shauh

(10) Patent No.: US 11,257,063 B2
(45) Date of Patent: Feb. 22, 2022

(54) TELEPHONE CALL PURCHASE WITH PAYMENT USING MOBILE PAYMENT DEVICE

(71) Applicant: Jack Shauh, San Diego, CA (US)

(72) Inventor: Jack Shauh, San Diego, CA (US)

(73) Assignee: VRAY INC., San Diego, CA (US)

( * ) Notice: Subject to any disclaimer, the term of this patent is extended or adjusted under 35 U.S.C. 154(b) by 412 days.

(21) Appl. No.: 15/903,458

(22) Filed: Feb. 23, 2018

(65) Prior Publication Data

US 2018/0247294 A1  Aug. 30, 2018

Related U.S. Application Data

(60) Provisional application No. 62/463,567, filed on Feb. 24, 2017.

(51) Int. Cl.
*G06Q 40/00* (2012.01)
*G06Q 20/32* (2012.01)
*G06Q 20/38* (2012.01)
*G06Q 20/20* (2012.01)
*G06Q 20/40* (2012.01)

(52) U.S. Cl.
CPC ........ *G06Q 20/3226* (2013.01); *G06Q 20/20* (2013.01); *G06Q 20/3255* (2013.01); *G06Q 20/385* (2013.01); *G06Q 20/3821* (2013.01); *G06Q 20/4012* (2013.01); *G06Q 20/40145* (2013.01)

(58) Field of Classification Search
CPC .............. G06Q 20/3226; G06Q 20/20; G06Q 20/3255; G06Q 20/3821; G06Q 20/385; G06Q 20/4012; G06Q 20/40145

USPC ....................................................... 705/35–40
See application file for complete search history.

(56) References Cited

U.S. PATENT DOCUMENTS

| | | | | |
|---|---|---|---|---|
| 8,645,222 B1 * | 2/2014 | Tamassia | ............ | G06Q 30/0635 705/26.1 |
| 9,532,222 B2 * | 12/2016 | Oberheide | ........... | G06Q 20/401 |
| 2012/0185398 A1 * | 7/2012 | Weis | .................... | G06Q 20/401 705/75 |

(Continued)

FOREIGN PATENT DOCUMENTS

CA  2777885 A1 *  5/2013  ......... G06Q 20/3224

OTHER PUBLICATIONS

Solano et al: "One-Time URL: A Proximity Security Mechanism between Internet of Things and Mobile Devices", Published in: Sensors (Basel, Switzerland), 16(10), 1694, Oct. 13, 2016 (Year: 2016).*

*Primary Examiner* — Edward J Baird
(74) *Attorney, Agent, or Firm* — Parsons & Goltry; Robert Parsons; Michael Goltry

(57) ABSTRACT

A mobile payment system including a merchant, a mobile device having mobile payment capability, a server couplable to a payment network, and a merchant computing device couplable to the server. A purchase request is made of the merchant and a purchase identification is associated with the purchase. The purchase information is entered into the merchant computing device and the purchase identification is sent to the server with payment information. Mobile payment communication is established between the mobile device and the server using the purchase identification and a mobile payment for the purchase is made from the mobile device to a payment network through the server.

3 Claims, 5 Drawing Sheets

(56) References Cited

U.S. PATENT DOCUMENTS

| | | | | |
|---|---|---|---|---|
| 2013/0013499 A1* | 1/2013 | Kalgi | .................... | G06Q 20/12 |
| | | | | 705/41 |
| 2013/0018785 A1* | 1/2013 | Dolphin | ............. | G06Q 20/3223 |
| | | | | 705/40 |
| 2013/0060688 A1* | 3/2013 | Hurst | .................... | G06Q 30/06 |
| | | | | 705/41 |
| 2013/0317923 A1* | 11/2013 | Capps | .................... | G06Q 20/12 |
| | | | | 705/16 |
| 2015/0170141 A1* | 6/2015 | Klingen | ................ | G06F 16/951 |
| | | | | 705/41 |
| 2015/0324762 A1* | 11/2015 | Cook | .................. | G06Q 20/042 |
| | | | | 705/45 |
| 2016/0328707 A1* | 11/2016 | Wagner | ................ | G06Q 20/322 |
| 2017/0076274 A1* | 3/2017 | Royyuru | ................ | G06Q 20/20 |

\* cited by examiner

TELEPHONE CALL PURCHASE WITH PAYMENT USING MOBILE PAYMENT DEVICE

CROSS-REFERENCE TO RELATED APPLICATION

This application claims the benefit of U.S. Provisional Application No. 62/463,567, filed 24 Feb. 2017.

FIELD OF THE INVENTION

This invention relates to mobile payment systems.

More particularly, the present invention relates to mobile payment for telephone purchases.

BACKGROUND OF THE INVENTION

In the payments industry, mobile payments systems are becoming more widely used. Mobile payment applications as a virtual credit/debit card are starting to be provided to mobile devices such as smart phones, tablets, watches and other wearable devices, and the like. Mobile payment methods currently include Apple Pay, Android Pay, Samsung Pay etc. As an example, a mobile device capable of mobile payment, can be used in a point of sale (POS) terminal to pay for a sale in a retailer store. Mobile payment can provide strong security to prevent fraud by implementing EMV (Europay, MasterCard and Visa) Integrated Circuit Card Specifications for Payment Systems. Furthermore, mobile payment can provide strong security by implementing EMV Payment Tokenization Specifications, or a vendor specific payment token scheme.

However, if a merchant's web site is unavailable or not well known for purchase & payment, it must rely on telephone calls to take orders and payment information. While considered antiquated and inefficient, many businesses still rely on passing credit card information verbally during a telephone call to complete a sale. To pay, the customer needs to verbally give the credit information, e.g. card number, billing address, to a clerk or shop keeper on the other end of the telephone line. This is an error prone, unsecure and time-consuming process.

It would be highly advantageous, therefore, to remedy the foregoing and other deficiencies inherent in the prior art.

SUMMARY OF THE INVENTION

Briefly, to achieve the desired objects and advantages of the instant invention, provided is a mobile payment method including the steps of providing a merchant, providing a mobile device having mobile payment capability, providing a server coupled to a payment network, and providing a merchant computing device coupled to the server. A purchase is requested by a customer from the merchant. A purchase identification associated with the purchase is inputted into the merchant computing device and forwarded with payment information to the server. Mobile payment communication is established between the mobile device and the server using the purchase identification. A mobile payment for the purchase is made from the mobile device to a payment network through the server.

In specific applications, the purchase identification is associated with the purchase by communicating with the customer to obtaining a mobile identity of the mobile device for use as the purchase identification and inputting the mobile identity into the merchant computer. Establishing communication between the mobile device and the server includes the steps of the server establishing communication with the mobile device using the mobile identity to communicate with the mobile device associated with the purchase.

Inputting a purchase identification into the merchant computing device can include requesting a passcode from the server associated with the purchase from the merchant. The server generates the passcode associated with the purchase. The merchant computing device receives and displays the generated passcode from the server. The merchant communicates the passcode to the customer and the customer inputs the passcode into the customer mobile device. Alternatively, the mobile device requests the passcode generated by the server and the passcode is communicated to the merchant by the customer.

Also provided is a mobile payment system. The mobile payment system includes a merchant, a mobile device having mobile payment capability, a server couplable to a payment network, and a merchant computing device couplable to the server. A purchase request is made of the merchant and a purchase identification is associated with the purchase. The purchase information is entered into the merchant computing device and the purchase identification is sent to the server with payment information. Mobile payment communication is established between the mobile device and the server using the purchase identification and a mobile payment for the purchase is made from the mobile device to a payment network through the server.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE PREFERRED EMBODIMENTS

Figure 1:
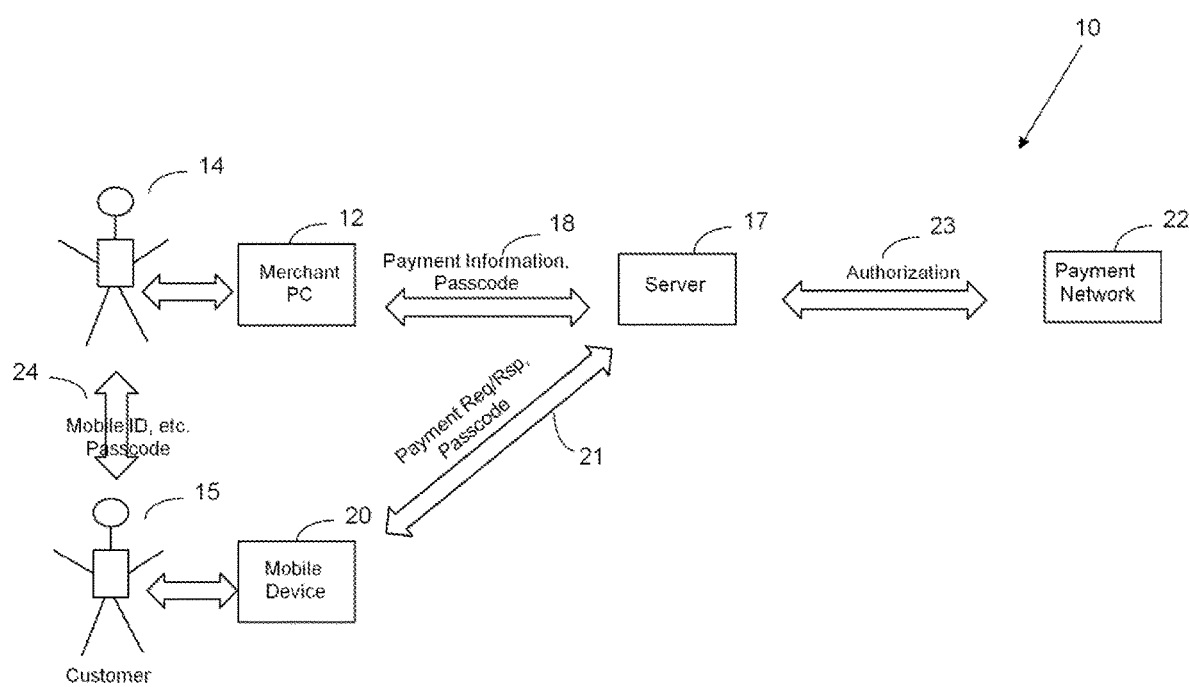
FIG. 1 is simplified block diagram of a payment system according to the present invention.

Turning now to the drawings in which like reference characters indicate corresponding elements throughout the several views, attention is first directed to FIG. 1 which is a block diagram of a mobile payment system 10 according to the present invention. System 10 includes a merchant computing device (merchant PC) 12 used by a merchant 14 to process an order and payment information from a customer 15. Merchant PC 12 can connect to a server 17 along a communication line 18. Communication line 18 can be any method that couples a computing device to a server, either hardwired or remotely, including networks such as the world wide web and the like. Merchant PC 12 can be any browser capable device such as a desktop computer, a laptop computer, a tablet computer, etc., capable of communicating with server 17 to initiate processing of a payment on purchase, and transfer purchase information. It will also be understood that merchant PC 12 can be a system consisting of multiple computing devices capable of communication with server 17. In this case, merchant PC 12 is either incapable of receiving mobile payments, or receiving mobile payment is undesirable with that specific device. A mobile device 20 is used by customer 15 to provide credit card or debit card payment information to merchant 14. The Mobile Device may be a smart phone, a tablet, or a wearable device capable of mobile payment which may be Apple Pay, Android Pay, Samsung Pay, or EMV. However, since merchant PC 12 cannot accept mobile payments or merchant 14 does not allow mobile payments through merchant PC 12, server 17 is couplable to mobile device 20 as illustrated by communication line 21, and is used to connect between merchant PC 12 and customer's mobile device 20 to relay payment request and response. Server 17 is in communication with a payment network 22 as illustrated by a communication line 23 to process payments received from mobile device 20. Server 17 can be a 3rd party server or can be owned by merchant 14. Merchant 14, through a clerk, and customer 15 are in communication through communication line 24. This communication can be by directly communicating in person, or through a communication device such as a telephone, cell phone, email, texting, instant messaging, and the like.

In this system, merchant 14, through a clerk, and customer 15 pass purchase and contact information through communication line 24. In particular, they communicate a purchase identification. For example, customer 15 communicates to merchant 14 a mobile identity of mobile device 20. Mobile identity is one instance of a purchase identification (purchase ID). Purchase ID is associated with a specific purchase. In one instance, the purchase ID associates a specific mobile device with a purchase from merchant 14. One of these, mobile identity, is information designating mobile device 20, such as a telephone number and the like. Mobile identity is used herein to establish a means of communicating with the mobile device, and associate the mobile device with the purchase. Mobile identity can also include email, texting, instant messaging and the like. Merchant 14 manually inputs the mobile identity into merchant PC 12 which then sends the mobile identity and payment information related to the purchase by communication line 18 to server 17. Server 17 then forwards payment request 26 to mobile device 20 to authorize payment. Server 17 identifies the correct mobile device associated with the purchase and establishes mobile payment communication line 21 using the mobile identity received from merchant PC 12. Conventional mobile payment protocols can then be followed between mobile device 20 using mobile payment, server 17 and payment network 22.

In another method, server 17 can generate a unique transaction passcode which serves as the purchase ID. This passcode is sent to merchant PC 12 as associated with the purchase. For example, the passcode can be 5 alphanumerical digits. Merchant 14, through a clerk, can communicate the transaction passcode to customer 15 through communication line 24. The customer can then use any mobile device 20 and can connect mobile payment communication to server 17 through communication line 21 using the transaction passcode. Merchant PC 12 can send billing information with the transaction passcode to server 17 by communication line 18. Server 17 then routes a payment request corresponding to that transaction passcode to mobile device 20.

In yet another method, server 17 can generate a unique transaction passcode as the purchase ID and forwards that passcode to customer's mobile device 20. For example, the passcode can be 5 alphanumerical digits. The customer's mobile device can connect to server 17 with the transaction passcode. Customer 15 communicates the transaction code to merchant 14 through a clerk, and merchant PC 12 can send bill information with that transaction code to server 17. Server 17 then routes a payment request associated with that transaction passcode to the mobile device 20, corresponding to that transaction passcode.

Figure 2:
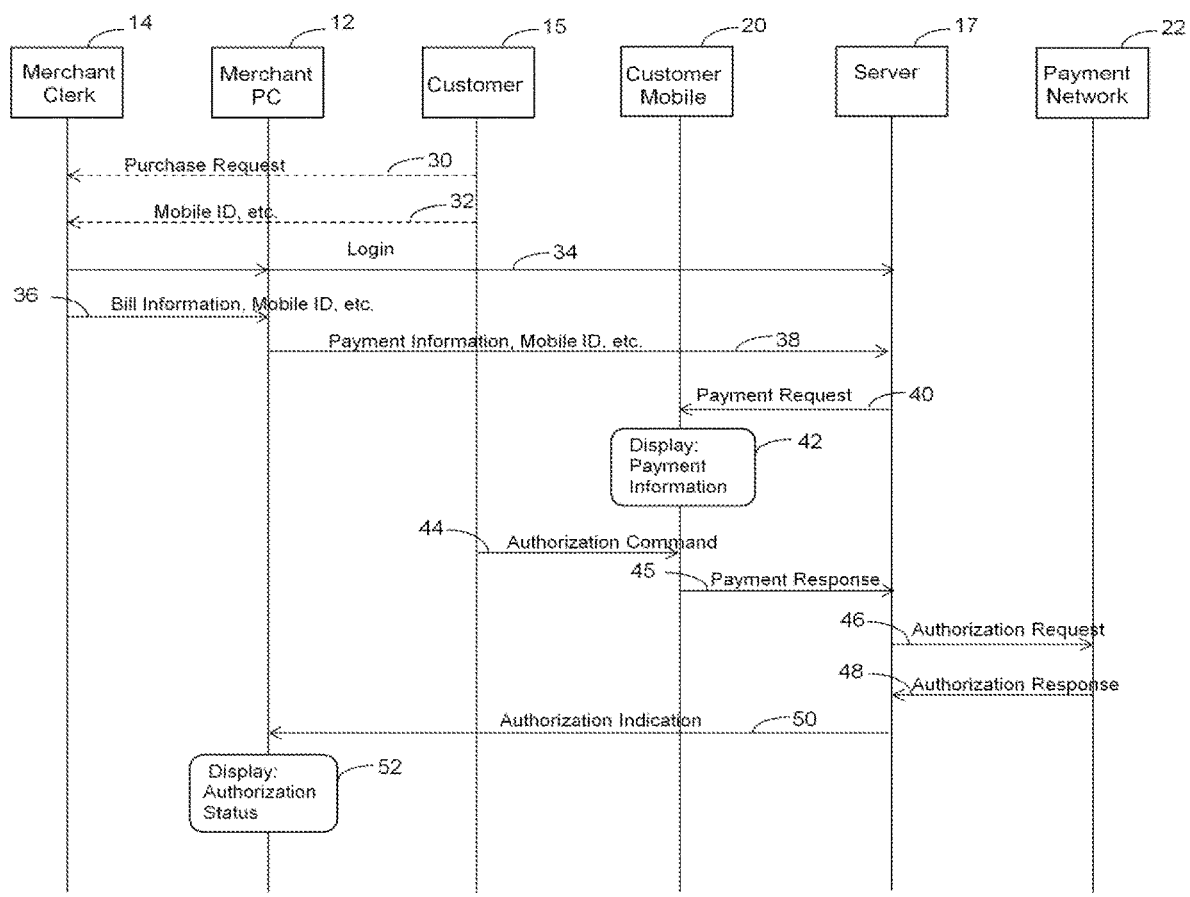
FIG. 2 is a schematic of the message exchange between elements of the payment system according to the present invention.

Turning now to FIG. 2, an example of the method steps for a payment using system 10 is illustrated. The process is initiated when customer 15 places a call to merchant 14 using the merchant's phone number and requests to make a purchase. While calling on the telephone is used in this specific embodiment, it will be understood that other means of communication can be employed as discussed previously. In essence, customer 15 makes a purchase request 30 of merchant 14 through a clerk. Customer 15 then provides a mobile identity 32 of mobile device 20 as a purchase ID for verification of purchase. Mobile device 20, as described previously, is capable of making mobile payments. The mobile identity can be a mobile telephone number or customer's account number registered with server 17 or any other method of facilitating communication between mobile device 20 and server 17. In addition, customer 15 can provide billing address, billing name, etc. for additional verification. Merchant 14 through a clerk then establishes communication between merchant PC 12 and server 17 such as by login 34. Merchant 14 may need to perform a login procedure by entering username and password with server 17 to establish communication between merchant PC 12 and server 17, if not already established. Merchant 14, through a clerk, manually enters 36 the Mobile identity, etc. and billing information, e.g. payment amount, etc. on merchant PC 12. Merchant PC 12 then sends 38 the mobile identity, and payment information, e.g. payment amount, currency code, merchant identity, merchant name, transaction time, etc., to server 17. Server 17 receives the payment information and sends 40 a payment request to mobile device 20 associated with the purchase ID, which in this instance is a mobile identity. Server 17 has the mobile identity associated with the payment information, and therefore can communicate with mobile device 20 using the mobile identity. For example, if the mobile identity is the mobile telephone number of mobile device 20, server 17 can send a push notification or short message to mobile device 20. Payment information can include payment amount, currency code, merchant identity, merchant name, transaction time, etc. Mobile device 20 receives payment request 40 and displays 42 payment information to customer 15 to verify and prompt customer 15 to enter PIN, fingerprint or other identification process, such as facial identification, to initiate mobile payment. Customer 15 authorizes 44 the payment and mobile device 20 generates a payment token after PIN, fingerprint or other identification process, such as facial identification, is successfully verified. Mobile device 20 then sends a payment response 45 to server 17. Payment response 45 can include payment token, payment amount, merchant identity, merchant name, transaction time, etc. Server 17 receives payment response 45 and sends an authorization request 46 to payment network 22. Payment network 22 processes the transaction and replies with an authorization response 48 to server 17. Server 17 sends authorization indication 50 to merchant PC 12 to indicate the status, e.g.

approval or disapproval. Merchant PC 12 then displays 52 the transaction status to a clerk of merchant 14.

Figure 3:
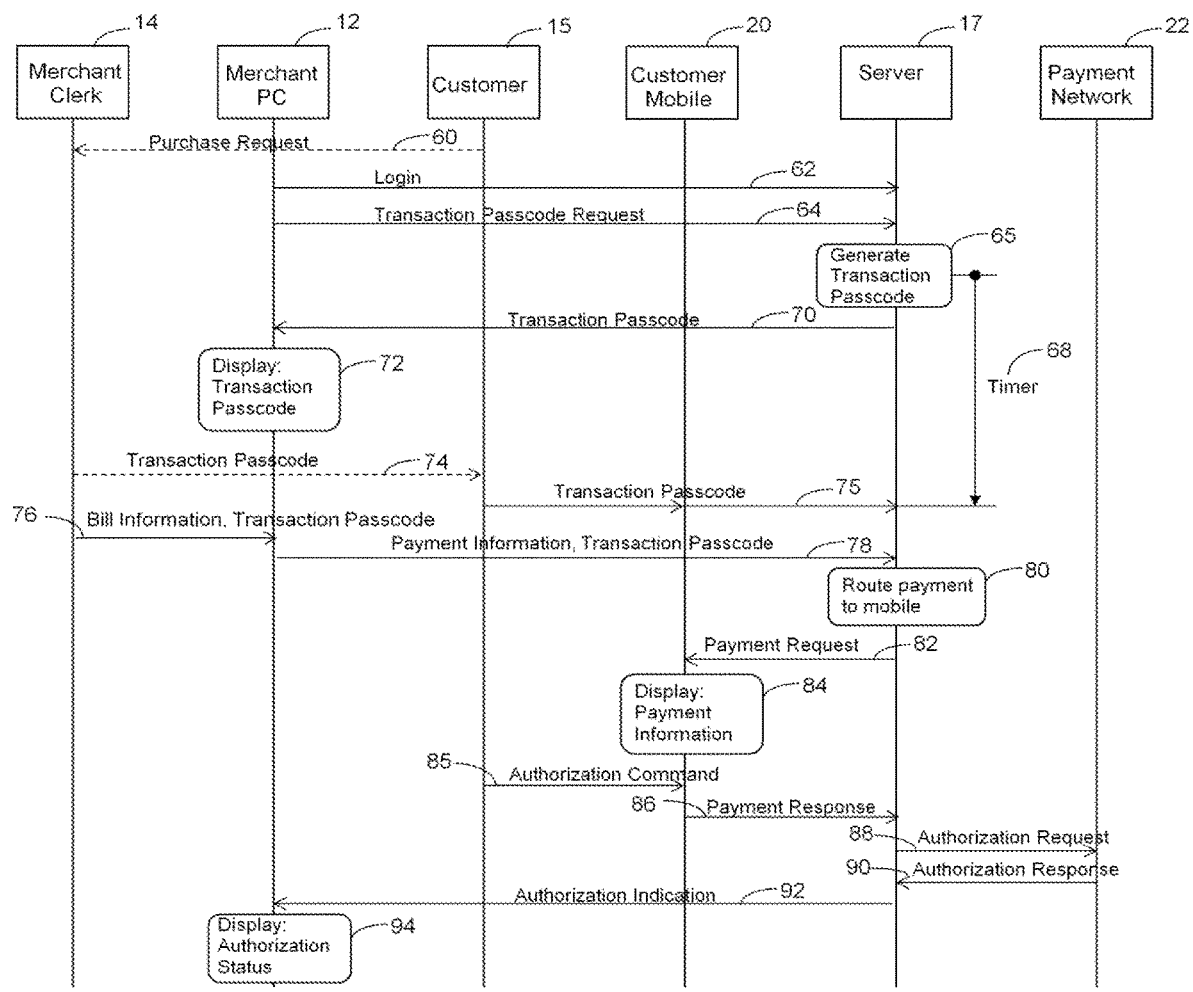
FIG. 3 is a schematic of another message exchange between elements of the payment system.

Referring now to FIG. 3, another example of the method steps for a payment using system 10 is illustrated. While similar to the previous method, in this specific example, the method does not require a mobile identity as purchase ID. Like in the previous example, customer 15 calls to the merchant's phone number, or other communication method as discussed previously, and communicates a purchase request 60. A clerk of merchant 14 may need to perform login procedure 62 by entering username and password with server 17, if not done yet. Merchant PC 12 requests transaction passcode 64 from server 17 to be used as a purchase ID in this embodiment. Server 17 generates 65 a unique transaction passcode for each transaction currently being processed by server 17, thus associating the passcode with a purchase. The transaction passcode is a onetime only use and can be used to differentiate on-going transactions currently being processed by server 17. Server 17 starts a timer 68 to avoid transaction passcode being reused by replay attack. Server 17 sends 70 transaction passcode to merchant PC 12. Merchant PC 12 displays 72 the transaction passcode to merchant 14 viewed by a clerk. Customer 15 launches mobile application in mobile device 20 and receives 74 the transaction passcode from merchant 14, generally by a clerk communicating the passcode through communication line 24 described previously. Customer 15 enters the transaction passcode in the user interface in mobile device 20 and mobile device sends 75 transaction passcode to server 17. Server 17 determines that the transaction passcode was previously generated and clears timer 68 of that transaction passcode. Merchant 14 enters 76 the transaction passcode and bill information, e.g. payment amount, etc., on merchant PC 12. Merchant PC 12 sends 78 the transaction passcode and payment information, e.g. payment amount, currency code, merchant identity, merchant name, transaction time, etc., to server 17. Server 17 receives the transaction passcode and payment information. Server 17 determines the routing 80 of a payment request by matching the transaction passcode received from merchant PC 12 and the transaction passcode received from mobile device 20. Once the correct mobile device is determined, server 17 sends 82 a payment request to mobile device 20 having a matching transaction passcode. Mobile device 20 receives the payment request and displays 84 payment information to customer 15 to verify and prompt customer 15 to enter PIN, fingerprint or use other identification protocol, such as facial identification. Customer 15 authorizes 85 the payment and mobile device 20 generates a payment token after identity successfully verified. Mobile device 20 sends 86 payment response to server 17. The payment response can include payment token, payment amount, merchant identity, transaction time, transaction identity, etc. Server 17 receives the payment response and sends 88 the authorization request to payment network 22. Payment network 22 processes the transaction and replies 90 with an authorization response to server 17. Server 17 sends 92 an authorization indication to merchant PC 12 to indicate the status, e.g. approval and completion of purchase. Merchant PC 12 displays 94 the transaction status to merchant 14.

Figure 4:
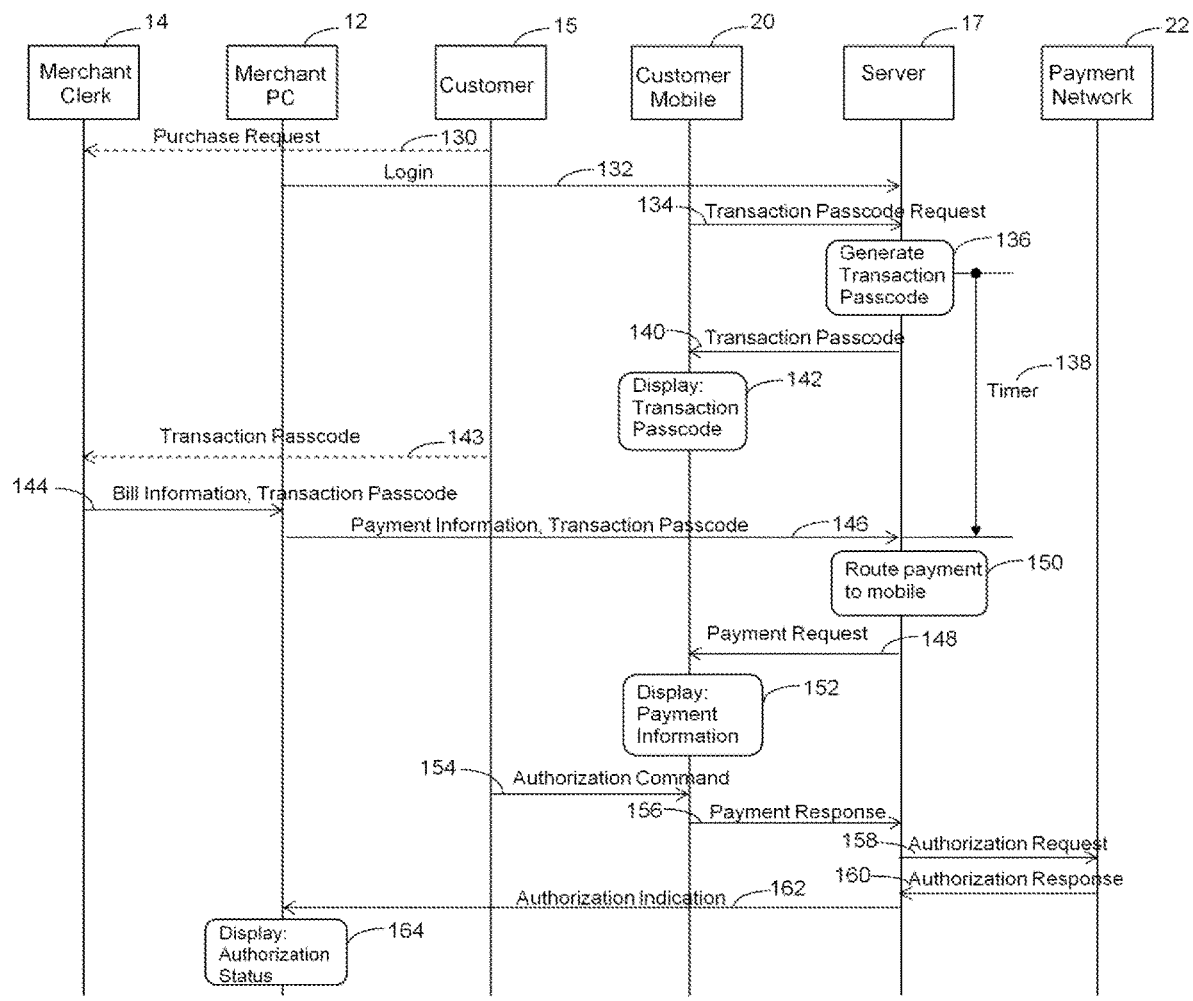
FIG. 4 is a schematic of yet another message exchange between elements of the payment system.

Referring now to FIG. 4, another example of the method steps for a payment using system 10 is illustrated. Like in the previous example, customer 15 calls to the merchant's phone number, or other communication method as discussed previously, and communicates a purchase request 130. A clerk of merchant 14 may need to perform login procedure 132 by entering username and password with server 17, if not done yet. Customer 15 launches a mobile application on mobile device 20 and mobile device 20 requests 134 a transaction passcode from server 17. The transaction passcode serves as the purchase ID in this instance, being associated with a purchase. Server 17 generates 136 a unique transaction passcode for each on-going transaction currently being processed by server 17. The transaction passcode is a one time use only and can be used to differentiate on-going transactions for purchases currently being processed by server 17. Server 17 starts a timer 138 to avoid a transaction passcode being reused by replay attack. Time 138 can be started upon generating 134 a passcode or upon sending 140 the passcode. Server 17 sends 140 a transaction passcode to mobile device 20. Mobile device 20 displays 142 the transaction passcode to customer 15. Customer 15 communicates 143 the transaction passcode to Merchant 14, communicating with a clerk using communication line 24. Merchant 14 enters 144 the transaction passcode and bill information, e.g. payment amount, etc., on merchant PC 12. Merchant PC 12 sends 146 the transaction passcode and payment information, e.g. payment amount, currency code, merchant identity, merchant name, transaction time, etc., to server 17. Server 17 determines that the transaction passcode was previously generated and clears timer 138 of that transaction passcode. Server 17 also sends 148 a payment request to mobile device 20. Server 17 routes 150 the payment request to mobile device 20 by matching the transaction passcode from merchant PC 12 and that generated by the server and passed to mobile device 20. Once the mobile device 20 is associated to the transaction by matching the transaction passcode, the remaining steps are the same as described immediately previously.

As will be understood, mobile device 20 may need to download a mobile application and register account name, billing address, mobile telephone number, etc. with server 17 to proceed with the previously described transactions using system 10 of the present invention. Some mobile applications may be system applications that do not need to be downloaded and come with mobile device 20.

The previously described methods do not discuss error cases and some additional handling can be added. For example, in FIG. 2, if mobile identity is not found in the registration database or additional verification information does not match with that of the mobile identity, server 17 can reply with a reject message to merchant PC 12 and merchant PC will display the message to merchant 14. Merchant 14 can then request customer 15 to confirm with the correct mobile identity and other verification information for a retry.

As another example, in the method illustrated in FIG. 3, if the transaction passcode in sent step 78 does not match, server 17 will reply with a reject message and merchant PC 12 will display to merchant 14. Merchant PC 12 can request another transaction passcode from server 17 to restart the process in another attempt.

In yet another example for FIG. 4, if the transaction passcode does not match, server 17 will reply with a reject message and merchant PC 12 will display to merchant 14. Merchant 14 can tell customer 15 to retry another request and customer 15 can communicate the new transaction passcode to merchant 14.

Additionally, if the timer in the various methods expires, server 17 can send a new transaction passcode to merchant PC 12 requesting retry in the method illustrated in FIG. 3. If the timer started at passcode generation 134 of the method illustrated in FIG. 4 expires, server 17 can send a new transaction passcode to mobile device 20 requesting retry. Mobile device 20 displays the new transaction passcode to customer 15 and customer 15 can tell merchant 14 the new passcode to retry the process.

While mobile device 20 may need to install a mobile app to perform the processing described above, a mobile web browser can be used to support the download of a program script (e.g. Java script) and launch the program script to interact with a mobile wallet without a mobile app, as illustrated with reference to FIG. 5.

Figure 5:
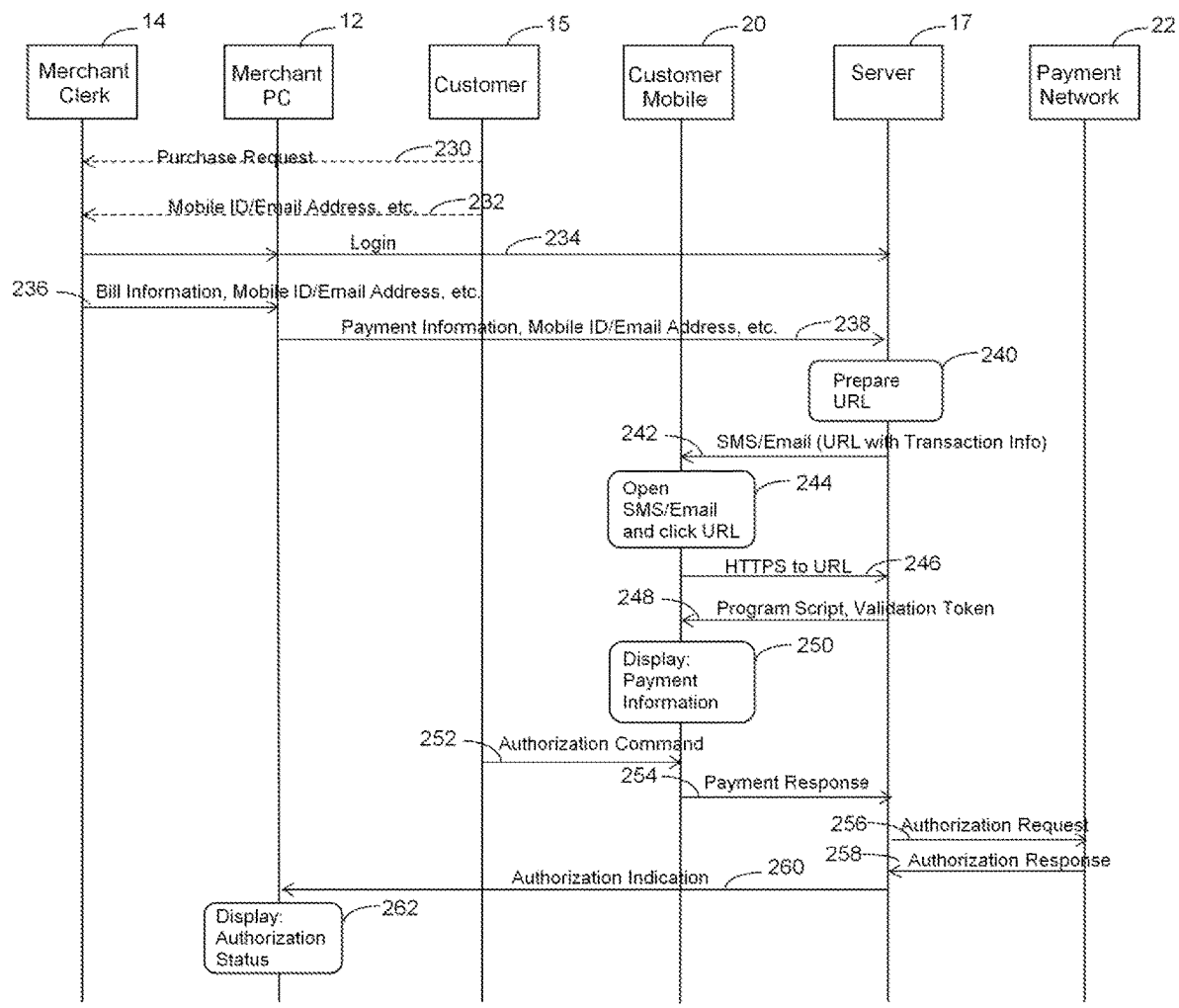
FIG. 5 is a schematic of a further message exchange between elements of the payment system.

Turning now to FIG. 5, an example of the method steps for a payment using system 10 is illustrated. The process is initiated when customer 15 places a call to merchant 14 using the merchant's phone number and requests to make a purchase. While calling on the telephone is used in this specific embodiment, it will be understood that other means of communication can be employed as discussed previously. In essence, customer 15 makes a purchase request 230 of merchant 14 through a clerk. At this time, customer 15 also provides 232 a mobile identity of mobile device 20 or email address to merchant 14. The mobile identity can be a mobile telephone number or customer's account number registered with server 17 associated with mobile telephone number. In addition, the customer can provide billing address, billing name, etc. for additional verification. Merchant 14 through a clerk then established communication between merchant PC 12 and server 17 such as by login 234. Merchant 14 may need to perform a login procedure by entering username and password with server 17 to establish communication between merchant PC 12 and server 17, if not already established. Merchant 14, through a clerk, enters 236 the Mobile identity/Email address, etc. and billing information, e.g. payment amount, etc. on merchant PC 12. Merchant PC 12 then sends 238 mobile identity/Email Address, and payment information, e.g. payment amount, currency code, merchant identity, supported networks, merchant name, transaction time, etc. to server 17. Server 17 prepares 240 a URL (Uniform Resource Locator) link that can include transaction information, e.g. transaction identity (TID), transaction time, payment information (e.g. transaction amount, currency code, merchant identity, supported networks, etc.) and message authentication code to protect the integrity of the transaction information. Server 17 sends 242 the URL (Uniform Resource Locator) in SMS (or MMS) to the mobile number or in email to the email address as previously received from merchant PC 12. Customer 15 receives SMS (or MMS) on mobile device 20 and will select 244 the URL link. Alternatively, customer 15 can receive an email and open the email on mobile device 20, then select the URL link. Mobile device 20 sets up 246 a HTTPS session with server 17 by using the URL link which can include transaction information. Server 17 may need to request a validation token from the mobile payment provider (e.g. Apple) to allow the mobile browser to interact with the mobile payment core to generate the encrypted payment data for each payment transaction. Server 17 downloads 248 a program script and validation token to mobile device 20. With transaction information embedded in the URL, the program script can retrieve the payment related information. Mobile device 20 displays 250 some payment information, e.g. transaction amount, merchant name (which can be derived from merchant identity; otherwise merchant name can be sent as part of URL) and etc., and prompt the customer to authorize. Mobile device 20 receives payment request and displays payment information 250. The customer is required to authorize 252 the payment using biometric input, e.g. fingerprint, facial identification, or passcode. The program script interacts with the mobile payment core of the mobile device to generate the encrypted payment data. The encrypted payment data can include payment token (i.e. substituted credit or debit card number), transaction amount, currency code, cryptogram of card transaction verification, etc. Mobile device 20 sends payment response 254 to server 17. The payment response may include payment token, payment amount, merchant identity, merchant name, transaction time, transaction identity, etc. Server 17 receives payment response 254 and sends an authorization request 256 to payment network 22. Payment network 22 processes the transaction and replies with an authorization response 258 to server 17. Server 17 sends authorization indication 260 to merchant PC 12 to indicate the status, e.g. approval or disapproval. Merchant PC 12 then displays 262 the transaction status to a clerk of merchant 14.

In specific examples, the URL can include the URL address of server 17 and transaction information. For example, www.xyz.com/pay.html?tid1=123456&tim=2017: 09:18:15:57&amt=49.99&cur=02&mid=xyz.com.wallet& &cap=07&mac=zndsepfae930and040ck83nokd0ns823

The information after "?" is the transaction information, whose parameters are separated by "&". The parameter value starts with "parametername=". For example, the parameter names can include the following:

tid1: part of transaction identity tim; transaction time yyyy:mm:dd:hh:mm. For example, tim appended with tid1 becomes a transaction identity, i.e. yyyy:mm:dd:hh:mm/nnnnnn amt: transaction amount cur: currency code mid: merchant identity, e.g. xyz.com.wallet (e.g. wallet can be a mobile wallet provider name)

cap: supported brand network, Bit 0: 'American Express'; Bit 1: 'Master Card'; Bit 2: 'Visa' mac: Message authentication code, i.e. security hash of the URL content. This is to verify that the URL was truly generated by the Server and that the integrity of the URL content. In case of failure in verification, the merchant can decline the remaining procedures.

Depending on the mobile payment API requirement, other parameter names and values can be added or change in the URL.

Note that the URL may be too long to fit into one SMS text, segmentation of the URL into multiple SMS texts may be needed; however, that would increase the probability of missing the URL (due to missing any one segmented SMS text) or increase the texting cost (due to multiple SMS texts); hence, an alternative method described below can be used:

i. A small SMS trigger text with transaction Id (and other subset of transaction information, e.g. transaction amount, merchant identity and/or message authentication code, may be included) can be sent first to the mobile device.

ii. Once user clicks on the SMS trigger text, which launches a HTTPS connection to online merchant. Online merchant launches a program script, which initiates a HTTPS session to processing server to request detail payment transaction information.

Alternative messaging methods can be used to send URL link with embedded transaction identity, e.g. WhatsApp, Skype, LINE, WeChat, Facebook messaging, etc.

Various changes and modifications to the embodiments herein chosen for purposes of illustration will readily occur to those skilled in the art. To the extent that such modifications and variations do not depart from the spirit of the invention, they are intended to be included within the scope thereof, which is assessed only by a fair interpretation of the following claims.

Having fully described the invention in such clear and concise terms as to enable those skilled in the art to understand and practice the same, the invention claimed is:

1. A mobile payment method comprising the steps of:
    making a purchase request by a customer to a clerk at a merchant store;
    providing, by the customer, at least one of a mobile identity of a mobile device having mobile payment capability and an email address, to the clerk;
    establishing communication, by the clerk, between a merchant computing device and a server coupled to a payment network;
    manually inputting, by the clerk, at least one of the mobile identity and the email address to the merchant computing device;
    sending at least one of the mobile identity and the email address, and transaction information for the purchase to the server by the merchant computing device;
    creating a Uniform Resource Locator (URL) link by the server, the URL link containing the transaction information including information required by a mobile wallet Application Programming Interface (API) used in the transaction;
    sending the URL link by the server to the mobile device in one of a Short Message Service (SMS) using the mobile identity, a Multimedia Message Service (MMS) using the mobile identity and in an email using the email address;
    displaying the URL link by the mobile device;
    selecting the URL link by the customer;
    setting up a Hypertext Transfer Protocol Secure (HTTPS) session by the mobile device with the server;
    downloading a program script and validation token by the mobile device in the HTTPS session from the server; and
    confirming payment transaction by the mobile device, the step of confirming payment transaction includes the program script retrieving the payment related information embedded in the URL, interacting with a mobile payment core of the mobile device, and using the retrieved payment related information from the URIL;
    generating, by the mobile payment device, encrypted payment data and sending, by the mobile payment device, the encrypted payment data to the payment network through the server.

2. A mobile payment method as claimed in claim 1 wherein the step of providing, by the customer, at least one of the mobile identity of the mobile device and an email address, includes the step of placing a call by the customer to the clerk to verbally provide at least one of the mobile identity and the email address.

3. A mobile payment method as claimed in claim 1 wherein the step of sending the mobile identity and transaction information includes the transaction information including a transaction identity, a transaction amount, a currency code, a merchant identity, supported networks and a message signature.

* * * * *